United States Patent
Helmsen et al.

(10) Patent No.: US 9,930,059 B1
(45) Date of Patent: Mar. 27, 2018

(54) METHODS AND APPARATUS FOR ANALYZING ASYNCHRONOUS CYBER-THREAT EVENT DATA USING DISCRETE TIME INTERVALS

(71) Applicant: Lookingglass Cyber Solutions, Inc., Baltimore, MD (US)

(72) Inventors: John Joseph Helmsen, Rockville, MD (US); Ken Allen, Westminster, MD (US); Christopher Paul Pinney Wood, Centreville, VA (US)

(73) Assignee: Lookingglass Cyber Solutions, Inc., Baltimore, MD (US)

( * ) Notice: Subject to any disclaimer, the term of this patent is extended or adjusted under 35 U.S.C. 154(b) by 209 days.

(21) Appl. No.: 15/087,517

(22) Filed: Mar. 31, 2016

(51) Int. Cl.
   *G06F 11/00* (2006.01)
   *H04L 29/06* (2006.01)
   *G06F 3/0481* (2013.01)
   *G06F 12/14* (2006.01)

(52) U.S. Cl.
   CPC ........ *H04L 63/1433* (2013.01); *G06F 3/0481* (2013.01)

(58) Field of Classification Search
   CPC combination set(s) only.
   See application file for complete search history.

(56) References Cited

U.S. PATENT DOCUMENTS

| | | | |
|---|---|---|---|
| 9,118,714 B1* | 8/2015 | Thomson | H04L 63/1441 |
| 2012/0096552 A1* | 4/2012 | Paek | G06F 21/552 |
| | | | 726/23 |
| 2015/0073981 A1* | 3/2015 | Adjaoute | G06Q 30/0225 |
| | | | 705/39 |
| 2016/0080408 A1* | 3/2016 | Coleman | H04L 63/1433 |
| | | | 726/22 |
| 2016/0173446 A1* | 6/2016 | Nantel | H04L 63/1425 |
| | | | 726/11 |

\* cited by examiner

*Primary Examiner* — Gary S Gracia
(74) *Attorney, Agent, or Firm* — Cooley LLP

(57) ABSTRACT

Apparatus and methods described herein relate to a global workspace manager that can dynamically update historical cyber-threat data for a network. The global workspace manager can receive cyber-threat event data including a time of a cyber-threat event. The global workspace manager can identify a workspace node in a workspace graph associated with the cyber-threat event data, and can identify a threat score interval including a set of times that includes the time of the cyber-threat event. The global workspace manager can retrieve, from the workspace node, a threat score calculation function associated with the threat score interval, and can calculate a threat score for the workspace node during the threat score interval using the threat score calculation function and the cyber-threat event data. The global workspace manager can calculate a set of threat scores based on the threat score for the workspace nodes, such that each threat score in the set of threat scores is associated with the remaining workspace nodes in the workspace graph.

7 Claims, 7 Drawing Sheets

METHODS AND APPARATUS FOR ANALYZING ASYNCHRONOUS CYBER-THREAT EVENT DATA USING DISCRETE TIME INTERVALS

FIELD

The methods and apparatus described herein are generally related, for example, to improving the data and processing efficiency of cybersecurity technologies, including, for example, analyzing asynchronous cyber-threat event data using discrete time intervals.

BACKGROUND

In some known network systems, analysts can calculate threat scores for devices in a network system. These scores can factor temporal distance from cyber-threat events via logarithmic decay. These threat scores can act as a scalar summation of a multi-dimensional problem to include time since last threat event, nature of the threat event, number of threat events, and network distance from threat events against other devices. Analysts may manipulate, calculate, or disable such threat scores.

In such known network systems, however, analysts are unable to update threat scores based on historical data; that is, analysts can be unable to incorporate temporal delays from threat event time to the time of ingest and realization in such network systems. Additionally, in other known network systems, analysts store discrete threat scores for particular periods of time to allow analysts to modify historical threat scores, requiring such known network systems to store multiple discrete threat scores for each network system, and/or requiring such known network systems to store multiple representations of the network system to allow the analyst to calculate threat scores for various periods of time for the network system. Thus, even when some known network systems allow analysts to modify historical threat data, such known network systems require storing large quantities of data, and/or processing large quantities of data, thereby creating storage and processing inefficiencies that limit the scalability and responsiveness of such systems.

Accordingly, a need exists for methods and apparatus that efficiently allow analysts to store historical threat data, and that efficiently allow analysts to update threat scores for a network system using the historical threat data, without requiring the analyst to store large quantities of data or to process large quantities of data.

SUMMARY

In some implementations, an apparatus can include a global workspace manager that is implemented in at least one of a processor or a memory, and that, when operative, can receive, from a workspace from a set of workspaces, cyber-threat event data including a time of a cyber-threat event related to the workspace. The apparatus can further include a global time interval manager implemented in at least one of a memory or a processor, operatively coupled to the global workspace manager, and, when operative, configured to select a discrete time interval including the time of the cyber-threat event. The global time interval manager can also, when operative, recursively divide the discrete time interval into smaller discrete time intervals, and can store identifiers and/or other indicators of the smaller discrete time intervals in a time interval queue. The global workspace manager, when operative, can determine, for each discrete time interval represented in the time interval queue, a threat score function from a set of threat score functions and associated with each discrete time interval represented in the time interval queue. The global workspace manager, when operative, can also calculate, for each discrete time interval represented in the time interval queue, a threat score in the time interval queue using the threat score function for that discrete time interval represented in the time interval queue. The global workspace manager, when operative, can also apply, for each discrete time interval represented in the time interval queue, the threat score of the discrete time interval to a workspace graph defining a set of relationships between each workspace of the set of workspaces so as to initiate an update of a threat score for each remaining workspace of the set of workspaces based on a relationship between each of the remaining workspaces of the set of workspaces.

In some implementations, a process for calculating cyber-threat scores can include receiving cyber-threat event data including a time of a cyber-threat event, and identifying a workspace node from a set of workspace nodes in a factor graph that is associated with the cyber-threat event data. The process can further include identifying a threat score interval including a set of times, the threat score interval including a time that is from the set of times and that corresponds (e.g., within a predetermined threshold range of time, and/or the like) to the time of the cyber-threat event. The process can further include retrieving, from the workspace node, a threat score calculation function associated with the threat score interval, and calculating a threat score for the workspace node during the threat score interval using the threat score calculation function and the cyber-threat event data. The process can also include calculating a set of threat scores for the remaining workspace nodes, based on the threat score for the workspace node, each threat score from the set of threat scores being associated with the remaining workspace nodes in the set of workspace nodes.

In some implementations, a process for calculating cyber-threat scores can include storing a representation of a workspace graph during a first time, and storing a set of modifications to the representation of the workspace graph during a second time after the first time. The process can further include receiving cyber-threat event data including a time of a cyber-threat event, the time of the cyber-threat event being after the first time. When the time of the cyber-threat event is after the second time, the process can include modifying the representation of the workspace graph based on the cyber-threat event data and the set of modifications to produce a modified representation of the workspace factor group, and storing the modified representation of the workspace graph. The process thereby efficiently processes historical threat events through an iterative process within a set of workspaces across discrete time intervals.

DETAILED DESCRIPTION

Figure 1:
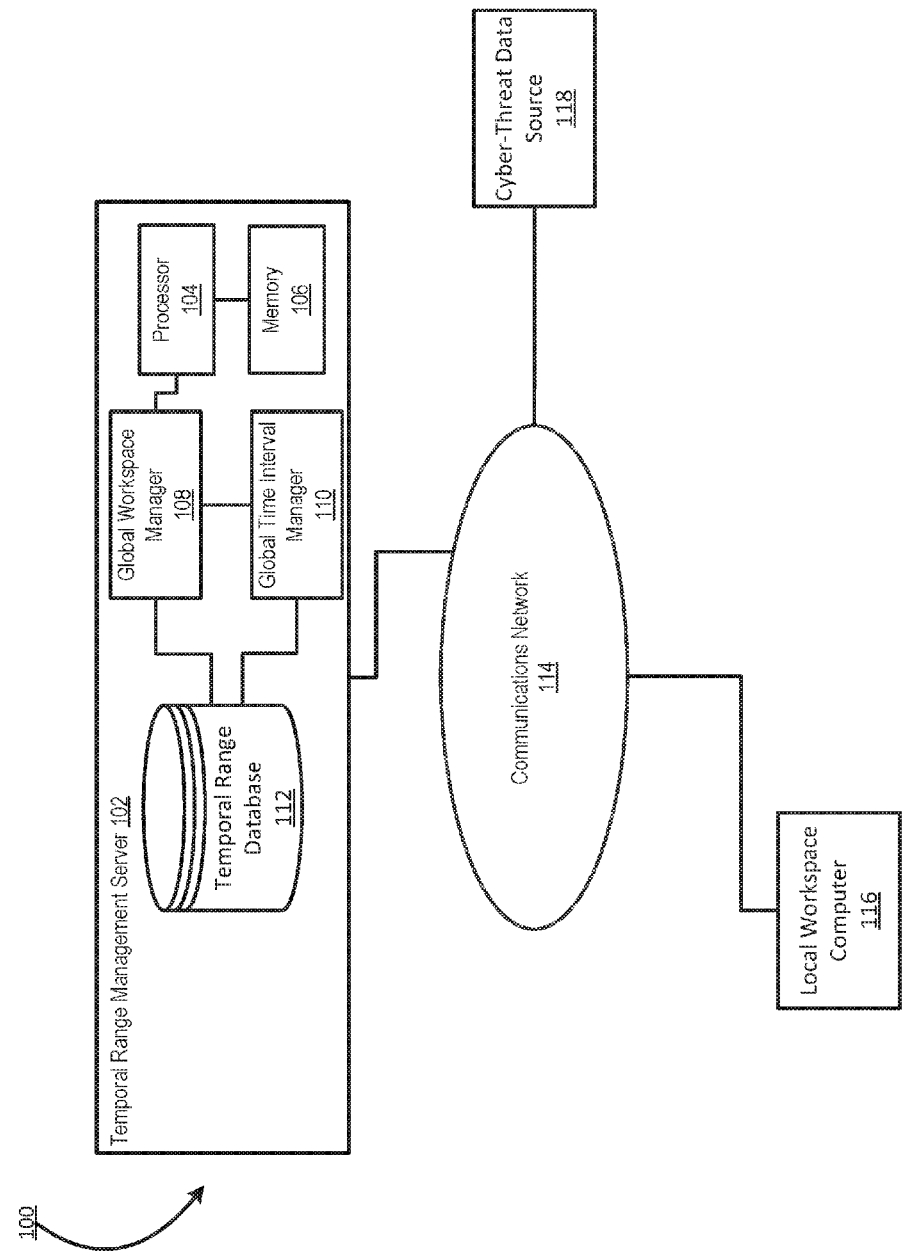
FIG. 1 is a schematic diagram illustrating a workspace network, according to an embodiment.

FIG. 1 is a schematic diagram illustrating an example workspace network 100. For example, in some implementations, the workspace network 100 can include a temporal range management server 102. The temporal range management server 102 can include at least one processor 104, at least one memory 106, and/or at least one temporal range database 112. The at least one processor 104 can be any hardware module and/or component configured to receive and process data, and/or to execute code representing executable instructions. In some embodiments, the at least one processor 104 can be a general purpose processor, a Field Programmable Gate Array (FPGA), an Application Specific Integrated Circuit (ASIC), a Digital Signal Processor (DSP), and/or the like.

The at least one memory 106 can be a hardware module and/or component configured to store data accessible by the at least one processor 104, and/or to store code representing executable instructions for the at least one processor 104. The memory 106 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 106 stores instructions to cause the at least one processor 104 to execute modules, processes and/or functions associated with a temporal range management server 102 and/or system.

The at least one processor 104 can implement a number of modules, compute devices, and/or server components, including but not limited to a global workspace manager 108 and a global time interval manager 110. The at least one processor 104 can be configured to execute instructions generated by any of the modules and/or server components, and/or instructions stored in the memory 106. In some implementations, if the temporal range management server 102 includes multiple processors 104, the modules and/or server components can be distributed among and/or executed by the multiple processors. The at least one memory 106 can be configured to store processor-readable instructions that are accessible and executable by the processor 104.

In some implementations, the modules, compute devices, and/or server components can be implemented on the processor 104 (e.g., as software executed on and/or implemented by the processor). In some implementations, the modules, compute devices, and/or server components can be software stored in the memory 106 and/or software executed by the processor 104. In other implementations, the modules, compute devices, and/or server components can be any assembly and/or set of operatively-coupled electrical components separate from the processor 104 and the memory, including but not limited to field programmable gate arrays (FPGAs) and/or application-specific integrated circuits (ASICs).

A global workspace manager 108 can be a module, compute device, and/or server component configured to manage the generation and modification of a global workspace hierarchy factor graph. For example, the global workspace manager 108 can use information about the workspace network 100 and a number of analysts accessing the workspace network 100, to generate and/or modify a workspace graph (e.g., a global workspace graph, and/or a local workspace graph). A global workspace graph can be, for example, a system workspace graph that is updated in response to new cyber-threat events in the network. A local workspace graph can be, for example, a workspace graph stored at a local workspace computer 116 and/or a similar device associated with a threat analyst; the local workspace graph can be modified by the threat analyst based on local cyber-threat data and/or events. The workspace graph can be stored in the temporal ranges database 112 as a data structure including information that a local workspace computer 116 can use to graphically render workspace nodes of the workspace graph, connections between the workspace nodes, and/or other related data. The global workspace manager 108 can use temporal range cyber-threat score functions to calculate cyber-threat data for the workspace graph, and to update cyber-threat data for the workspace graph.

A global time interval manager 110 can be a module, compute device, and/or server component configured to determine temporal ranges for each workspace in the workspace graph. For example, the global time interval manager 110 can determine time intervals for a workspace, and can determine a cyber-threat score function associated with each time interval for the workspace. The global time interval manager 110 can then provide the cyber-threat score function to the global workspace manager 108 for calculating cyber-threat scores for the workspace, and/or for other workspaces in the workspace graph. Further details with respect to time intervals can be found in at least FIGS. 3-7.

Figure 2:
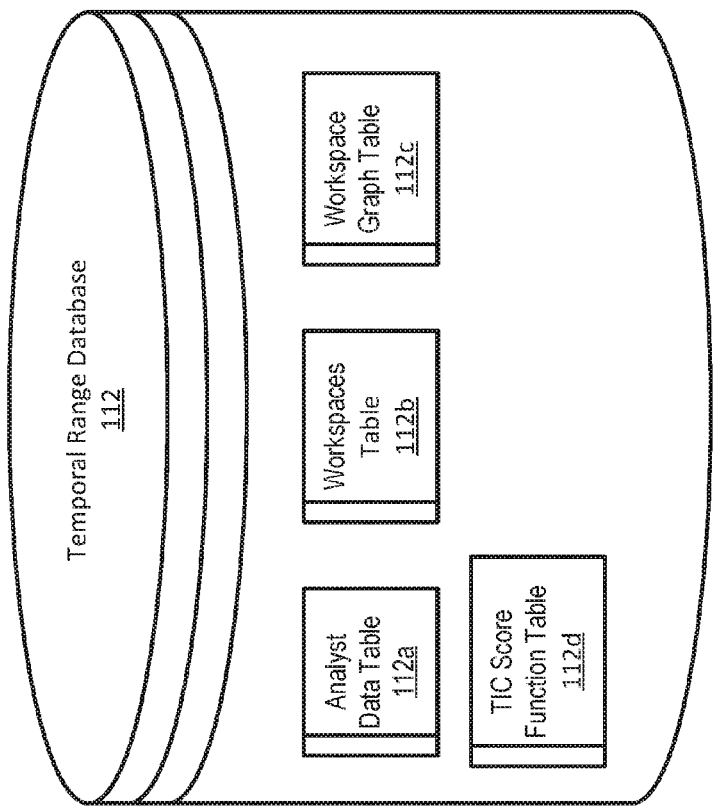
FIG. 2 is a schematic diagram illustrating a temporal range database, according to an embodiment.

The at least one temporal range database 112 can be a data store and/or memory configured to store multiple data records. Referring to FIG. 2, in some implementations, an example temporal range database 112 can include an analyst data table 112a, a workspaces table 112b, a workspace graph table 112c, and/or a threat indicator confidence (TIC) score function table 112d. Tables in the at least one temporal range database 112 can be distributed across multiple databases, or can be stored in one database. For example, the analyst data table 112a can contain records relating to analysts and/or other entities in the workspace network 100 and can receive and/or manage local workspace graph data. In some instances, the term "analysts" can refer to computing devices (e.g., local workspace computer 116), users operating local computing devices such as local workspace computer 116, and/or the like. A record in an analyst data table 112a can include an identifier of the analyst and/or other entity, identifying information associated with a local workspace computer 116 associated with the analyst, a workspace associated with the analyst, a workspace graph associated with the analyst, a date at which the analyst was added to the temporal range database 112, and/or other information relating to the threat analyst.

A workspaces table 112b can include information relating to analyst workspaces, and/or other workspaces included in a workspace graph. Workspaces can include data relating to a particular organization, a member of the organization, and/or other information. Workspaces can also include temporal ranges that are associated with cyber-threat score functions that an analyst and/or the global workspace manager 108 can use to calculate cyber-threat scores. A record in a workspaces table 112b can include a workspace identifier, a workspace scope identifier (e.g., a global workspace and/or a local workspace), an identifier associated with an analyst, an identifier of a workspace graph to which the workspace belongs, devices and/or other network elements associated with the workspace, a list of network and/or communication connections between various network elements associated with the workspace, threat information associated with the workspace, a set of scoring parameters associated with the workspace (including but not limited to a set of cyber-threat score functions and/or temporal ranges), a date indicating the last time the workspace data was updated and/or other information relating to a workspace.

A workspace graph table 112c can include representations of local and global workspace graphs for a network. A record in the workspace graph table 110c can include, for example, an identifier for a workspace graph, a workspace graph type (e.g., global or local), an identifier of a network with which the workspace graph is associated, a list of workspaces associated with the workspace graph, a hierarchy graph specifying the hierarchy of the list of workspaces, a list of identifiers associated with a local workspace computer 116 and/or analysts associated with the workspace graph, a date indicating the last time the workspace hierarchy factor graph was updated, and/or other information relating to workspace graphs.

A TIC score function table 112d can include data relating to TIC score functions. A record in the TIC score function table 112d, for example, can include a TIC score function identifier, a workspace identifier for a workspace associated with the TIC score function, a time and/or range of times with which the TIC score function is associated, a date at which the TIC score function was added to the TIC score function table 112d, and/or other data relating to a TIC score function. Further information regarding TIC scores and TIC score functions is described in U.S. patent application Ser. No. 14/339,441, expressly incorporated herein by reference. More information relating to the TIC score function can be found at least in FIGS. 3-7 and in the related discussion herein. While TIC score function table 112d herein includes TIC score function data, it should be noted that the temporal range database 112 can also and/or alternatively include one or more tables storing various types of threat score functions. For example, while not shown, the temporal range database 112 can also and/or alternatively include one or more tables storing a threat score function identifier, a threat score function, a workspace identifier for a workspace associated with the threat score function, and/or similar data as described in the TIC score function table 112d, for other types of threat score functions.

Returning to FIG. 1, a communications network 114 can be the Internet, and/or a similar wireless and/or wired network that enables the temporal range management server 102 to communicate with a local workspace computer 116, and/or with other network devices (e.g., such as a cyber-threat data source 118). For example, the communications network 114 can be a telephone network, an Ethernet network, a fiber-optic network, a cellular network, and/or a similar wired and/or wireless network. In some implementations, the communications network 114 can include a single network to which a number of workspaces, network elements, and/or network objects can belong. In other implementations, the communications network 114 can include multiple networks operatively coupled to each other, e.g., via one or more routers, switches, and/or network gateways.

Each local workspace computer 116 can be a computing device including at least one of a processor and/or memory similar to those of the temporal range management server 102. The local workspace computer 116 can be configured to receive and/or store a local version of a workspace graph stored at the temporal range database 112, and can process the information, and/or can display the information on at least one display operatively coupled to the local workspace computer 116. For example, the local workspace computer 116 can render the local version of the workspace graph information on the display of the local workspace computer 116, and can modify the rendered version of the workspace graph information, e.g., when global workspace graph information has been updated, when the local version of the workspace graph has been updated by an analyst and/or similar entity, and/or under similar circumstances. Each local workspace computer 116 can be associated with a particular workspace included in the workspace hierarchy graph, such that if a cyber-threat event involving (e.g., occurring, monitored, and/or identified at) the local workspace computer 116 occurs, the one or more workspaces in the workspace graph can be updated to reflect the cyber-threat event, and the updates can be sent to the local workspace computer 116 for display and/or further analysis.

Figure 3:
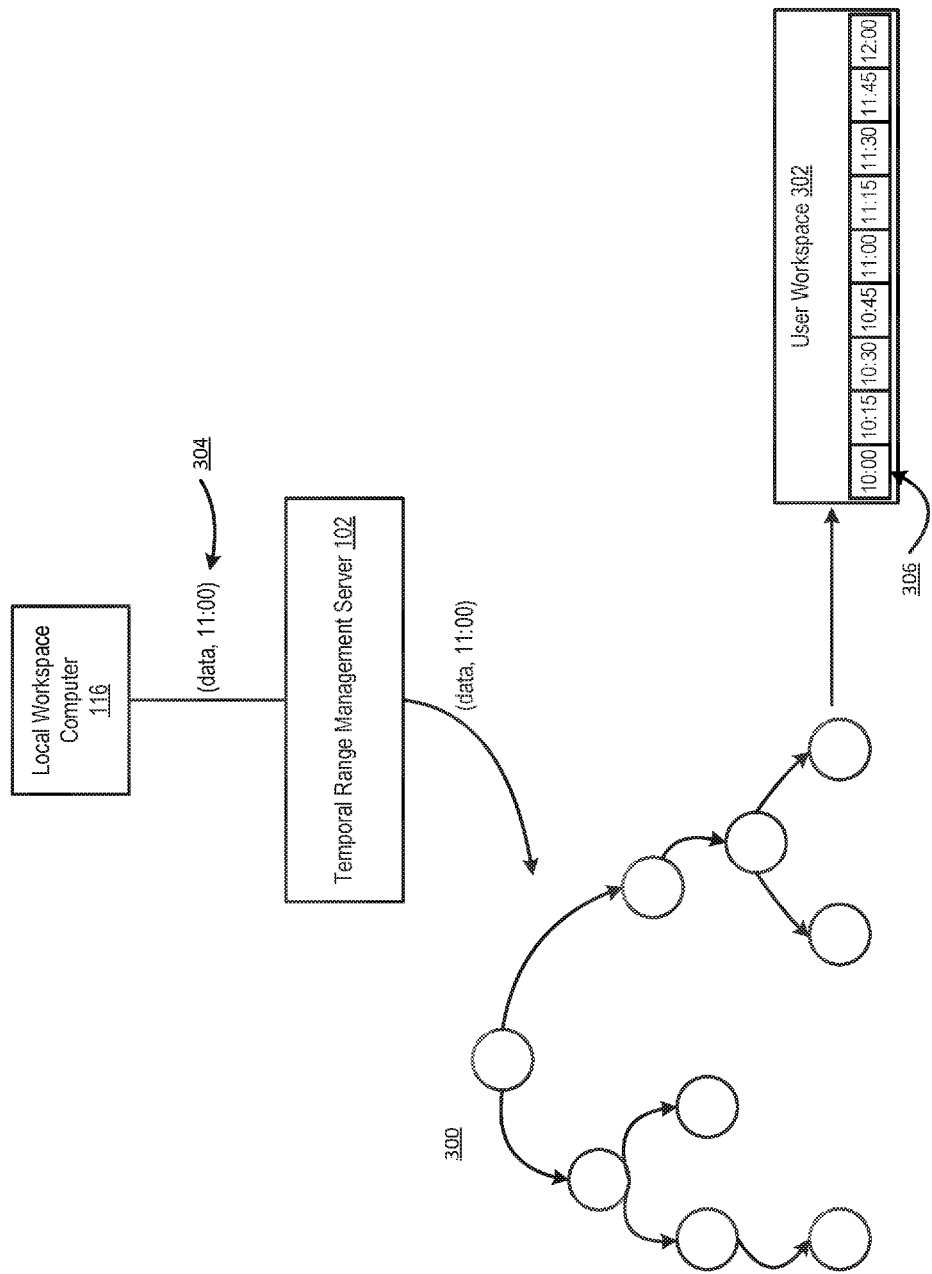
FIG. 3 is a diagram illustrating historical cyber-threat event data, according to an embodiment.

FIG. 3 is an example diagram illustrating example historical cyber-threat event data. For example, in some implementations, an analyst can send, via the local workspace computer 116, cyber-threat event data 304 associated with a cyber-threat event at a workspace (e.g., user workspace 302) in a workspace graph 300, at a network device associated with the workspace, and/or at another location in the workspace network 100. A cyber-threat event can include, for example, an event indicating the existence of a potential cyber-threat in the workspace network 100 (including but not limited to an indication of a corrupted and/or potentially malicious data file at a network device, an indication of a network device acting irregularly, and/or similar events). The cyber-threat event data can include data representing and/or identifying the cyber-threat event (e.g., e.g., data that identifies network devices, workspaces, and/or a workspace graph affected by the cyber-threat event, characteristics and/or similar information associated with the cyber-threat event, and/or the like), as well as a time at which the cyber-threat event occurred. The temporal range management server 102 can receive the cyber-threat event data 304, and can determine a workspace graph 300 associated with the cyber-threat event data 304, e.g., based on an identifier (e.g., of a workspace, of a workspace graph, and/or the like) included in the cyber-threat event data.

The workspace graph 300 can include a user workspace 302 (and/or a different type of workspace, such as an organization workspace, a project workspace, and/or the like) related to the cyber-threat event. Further information regarding workspace graphs can be found at least in co-pending U.S. patent application Ser. No. 15/049,782 (entitled "METHODS AND APPARATUS FOR EFFICIENT STORAGE AND PROCESSING OF GLOBAL AND LOCAL CYBER THREAT DATA IN A DISTRIBUTED FACTOR GRAPH DATABASE"), the entire contents of which are expressly incorporated herein by reference. The workspace graph 300 can include a set of cyber-threat score functions each associated with at least one time interval 306 of the user workspace 302. In some implementations, the time interval can be a period of time (e.g., a second, a minute, half an hour, a day, and/or the like) during which cyber-threat data has been received and/or processed for the user workspace 302. In some implementations, the time intervals can be based on a clock different from a system clock time, such that the time intervals correspond to discrete time intervals that indicate when cyber-threat data was processed at the user workspace 302, relative to when other cyber-threat data was received and/or processed at the user workspace 302. For example, the first set of cyber-threat data received for the user workspace 302 can be indicated as being received at time interval 0, the second set of cyber-threat data can be indicated as being received at time interval 1, and/or the like. In other implementations, the time intervals can be based on a system clock time, such that the time intervals correspond to periods in real-time in which the cyber-threat data was received and/or processed. For example, cyber-threat event data received at 10:00 AM at the user workspace 302 can be associated with a first time interval, while cyber-threat event data received at 10:15 AM can be associated with a second time interval, and/or the like. The temporal range management server 102 can use the temporal ranges associated with the workspace to determine a cyber-threat score function (e.g., a TIC score function, and/or a similar function) associated with a time at which the cyber-threat event occurred. The temporal range management server 102 can then calculate a cyber-threat score for the workspace based on the cyber-threat score function, the cyber-threat event data, and/or other data.

Figure 4:
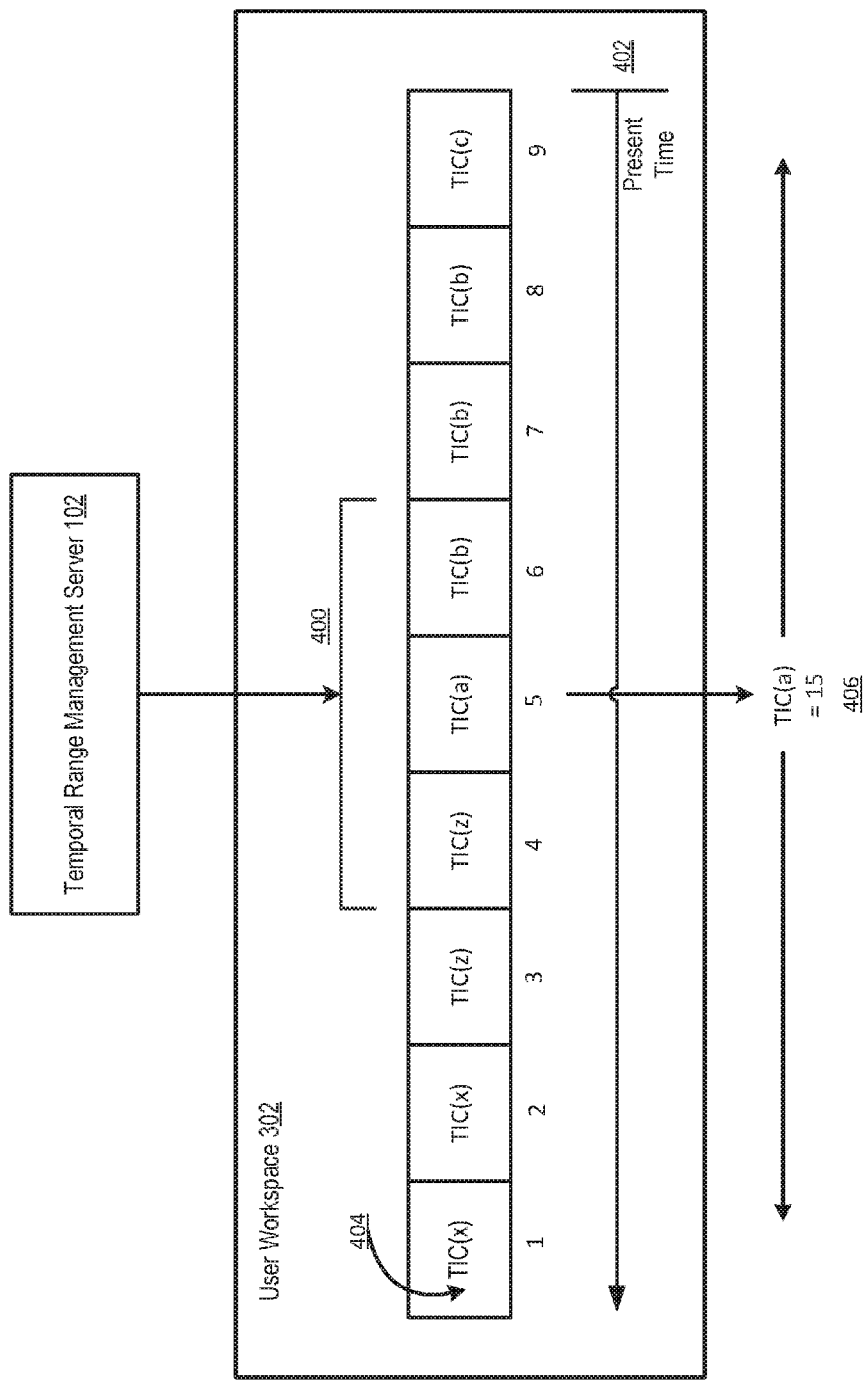
FIG. 4 is a diagram illustrating temporal ranges, according to an embodiment.

FIG. 4 is an example diagram illustrating example temporal ranges (also referred to herein as "time intervals"). For example, each user workspace 302 can include a number of discrete time intervals 1-9 that, when combined, represent a full timeline of discrete time intervals 402 of the user workspace 302. The full timeline of discrete time intervals 402 can include time intervals spanning the history of the user workspace 302 (e.g., a span of time starting at the time at which the user workspace 302 was defined, to a present time, and/or the like). Each discrete time interval can be associated with a cyber-threat score function 404 used to calculate a cyber-threat score 406 for that discrete time interval. Each cyber-threat score function 404 can vary, e.g., based on cyber-threat event data received at the user workspace 302 for that discrete time interval, based on changes made to the user workspace 302 within that discrete time interval, and/or based on other factors. The cyber-threat score function 404 can be assigned to a discrete time interval based on cyber-threat event data received during the discrete time interval, based on an analyst assigning a particular cyber-threat score function 404 to the discrete time interval, and/or the like. For example, the global time interval manager 110 can assign a cyber-threat score function 404 to a discrete time interval when parameters of the cyber-threat score function 404 (e.g., network devices used to calculate a cyber-threat score using the cyber-threat score function, and/or the like) match the parameters of cyber-threat event data received during the discrete time interval. As another example, an analyst can assign a cyber-threat score function 404 to the discrete time interval, by sending an assignment request to the temporal range management server 102, via a local workspace computer 116.

When the temporal range management server 102 receives cyber-threat event data, the global time interval manager 110 can determine a discrete time interval associated with the cyber-threat event data, e.g., by matching a time period in the cyber-threat event data with a discrete time interval in the timeline of discrete time intervals 402 associated with the user workspace 302. The global time interval manager 110 can, for example, divide the timeline of discrete time intervals into smaller time interval ranges 400, and can continue to divide the smaller time interval ranges 400 until the global time interval manager 110 can identify a discrete time interval (e.g., one of discrete time intervals 4-6) to associate with the cyber-threat event data. In some implementations, the global time interval manager 110 can divide the entire timeline of discrete time intervals 402 of the user workspace 302; in other implementations, the global time interval manager 110 can process a portion of the timeline of discrete time intervals 402. A discrete time interval can be associated with the cyber-threat event data, e.g., when the time of the cyber-threat event is within a predetermined period of time from the specified time and/or range of times represented in the discrete time interval.

For example, a cyber-threat event can occur at noon on Day 5 after the instantiation of the user workspace 302. The global time interval manager 110 can split a timeline of discrete time intervals 402 into smaller time interval ranges (e.g., time interval range A can include Days 1-3; time interval range B can include Days 4-6; and time interval range C can include Days 7-9). The global time interval manager 110 can determine how to define the smaller time interval ranges, e.g., based on system and/or analyst-provided parameters division parameters. For example, the division parameters can specify that the global time interval manager 110 determine that each smaller time interval range can include up to three days of time, and/or that the timeline of discrete time intervals 402 can be divided into three equal time interval ranges, and/or the like. The time interval ranges can further be divided into discrete time intervals (e.g., time interval range B can be further divided into discrete time intervals for Day 4, 5, and 6), based on similar division parameters as those used to define the time interval ranges. The global time interval manager 110 can continue to divide the discrete time intervals into smaller discrete time intervals (e.g., can divide the Day 5 discrete time interval into "day" and "night," into a series of hours and/or minutes, and/or the like), depending on the division parameters, and/or can begin to match the cyber-threat event data to the discrete time intervals, without further dividing the discrete time intervals. The global time interval manager 110 can then determine which discrete time interval(s) most closely match to the cyber-threat event. For example, if the cyber-threat event occurred on Day 5, the global time interval manager 110 can determine that the discrete time interval corresponding to Day 5 most closely matches the cyber-threat event, and can associate that discrete time interval with the cyber-threat event.

As another example, a cyber-threat event can occur between 11:50 PM on Day 6 and 12:30 AM on Day 7, and/or that can occur at an unknown time between 11:50 PM on Day 6 and 12:30 AM on Day 7. The global time interval manager 110 can split a timeline of discrete time intervals 402 into smaller time interval ranges based on division parameters that specify that the global time interval manager 110 divide the timeline of discrete time intervals 402 into time interval ranges based on a cyber-threat score function being associated with the portions of the timeline of discrete time intervals. Thus, time interval range A can include Days 1-2; time interval range B can include Days 3-4; time interval range C can include Day 5; time interval range D can include Days 6-8; and time interval range E can include Day 9). Alternatively, as in the above example, the division parameters can specify that the global time interval manager 110 divide the timeline of discrete time intervals 402 into equal components (e.g., into three time range intervals of three days, and/or the like) and/or into a predetermined number of components (e.g., into three time range intervals of any number of days, and/or the like). The global time interval manager 110 can, based on the division parameters, determine whether or not to continue to divide the time interval ranges into discrete time intervals, and/or criteria to use to divide the time interval ranges into discrete time intervals. For example, the division parameters can specify that each time interval range be divided into a predetermined unit of time (e.g., that each time interval be divided into a set of discrete time intervals where each discrete time interval represents a day and/or hour, and/or the like). Thus, for example, the global time interval manager 110 can divide time interval range D into discrete time intervals representing Days 6, 7, and 8, based on division parameters. The global time interval manager 110 can further divide each discrete time interval into a set of hours (e.g., such that the Day 6 discrete time interval is divided into 24 discrete time intervals each representing a different hour of Day 6, and/or the like), and/or into similar smaller discrete time intervals. The global time interval manager 110 can then, for example, associate the cyber-threat event data with the discrete time interval Hour 23 (e.g., 11:00 PM) of Day 6, and the discrete time interval Hour 0 (e.g., 12:00 AM) of Day 7. Thus, the cyber-threat event data can be associated with multiple discrete time intervals, depending on the duration of the cyber-threat event. Additionally, if the global time interval manager 110 does not divide the Days 6-8 discrete time intervals further, the global time interval manager 110 can associate discrete time interval Day 6, and discrete time interval Day 7 with the cyber-threat event data, e.g., based on the duration of the cyber-threat event occurring both on Day 6 and on Day 7.

In other implementations, division parameters can specify that the global time interval manager 110 divide time interval ranges and discrete time intervals until a discrete time interval matches a time of the cyber-threat event, within a predetermined threshold. For example, if the cyber-threat event occurs at noon on Day 5, the global time interval manager 110 can be instructed to further divide discrete time interval Day 5 into hourly discrete time intervals, and the hourly discrete time intervals into minute discrete time intervals, and/or the like, until the global time interval manager 110 has generated a discrete time interval that exactly corresponds to the cyber-threat event time, that is within a minute of the cyber-threat event time, and/or that is within a similar predetermined unit of time of the cyber-threat event time.

The global time interval manager 110 can use the cyber-threat score function(s) 404 assigned to the discrete time interval(s) associated with the cyber-threat event, in addition to the received cyber-threat event data, to calculate a cyber-threat score 406 for the discrete time interval. For example, using the cyber-threat event data and parameters specified by cyber-threat score function TIC(a), the global time interval manager 110 can calculate a cyber-threat score (e.g., cyber-threat score 406) for discrete time interval 5. The global workspace manager 108 can then, for each discrete time interval in the time interval range 400, recalculate cyber-threat data for that discrete time interval, based on the updated cyber-threat score 406. The global workspace manager 108 can continue to propagate the effects of the updated cyber-threat score in this manner (e.g., recalculating cyber-threat scores for each discrete time interval) until the global workspace manager 108 can calculate a current workspace cyber-threat score for the user workspace 302. In this manner, the temporal range management server 102 can receive cyber-threat data associated with one or more previous and/or current discrete time intervals, can calculate modified cyber-threat scores based on cyber-threat score functions 404 associated with those discrete time intervals, and can update an overall cyber-threat score for the user workspace 302, without storing historical versions of the workspace graph, and without processing multiple historical workspace graphs to update the cyber-threat score for the user workspace 302.

Figure 5:
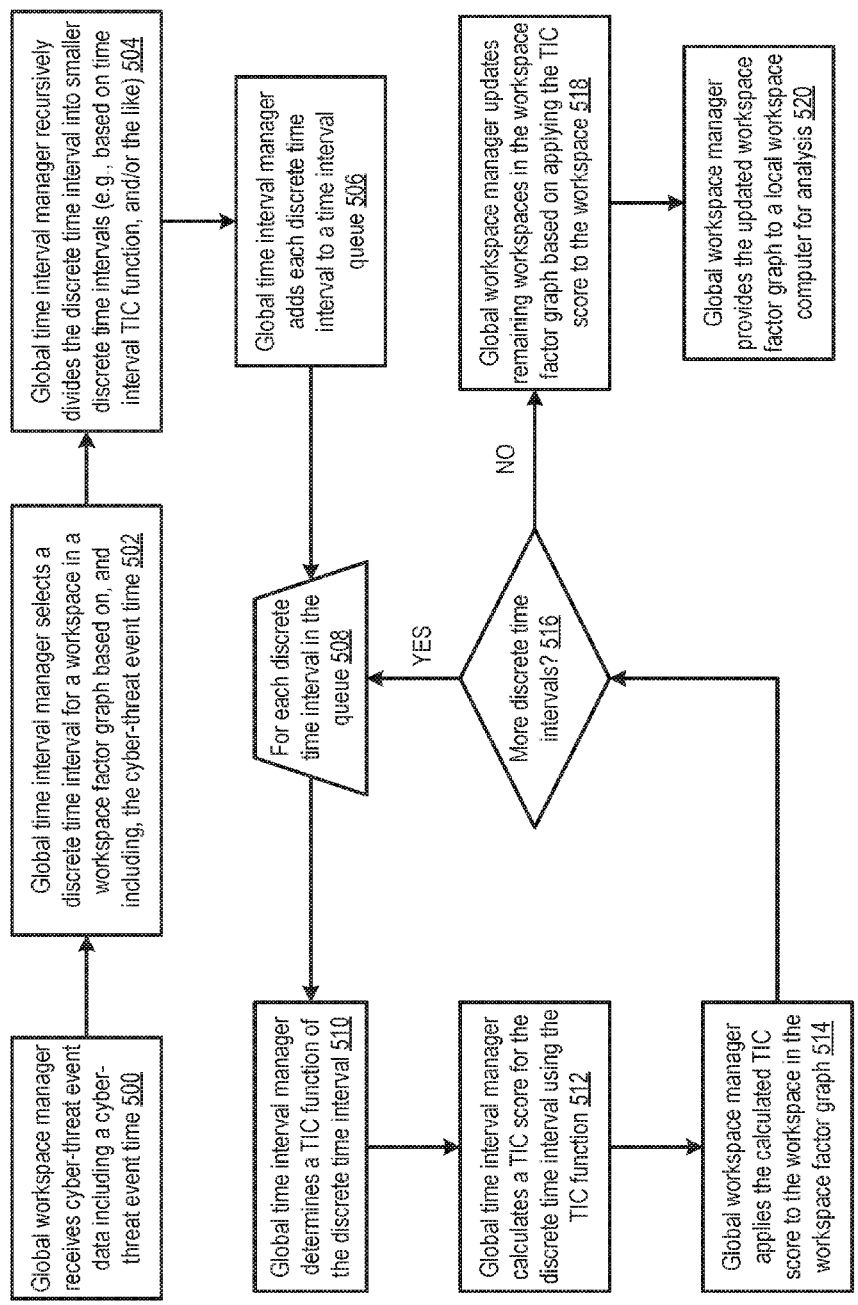
FIG. 5 is a logic flow diagram illustrating determining temporal ranges, according to an embodiment.

FIG. 5 is an example logic flow diagram illustrating determining temporal ranges. For example, in some implementations, a global workspace manager 108 can, at 500, receive cyber-threat event data. The cyber-threat event data can be received from a local workspace computer 116, from a cyber-threat data source 118 (e.g., a network device configured to detect cyber-threat events at other network devices, an external data source configured to provide cyber-threat event data to the temporal range management server 102, and/or the like), from a network device associated with a local workspace computer 116, and/or from a similar data source. The cyber-threat event data can include a cyber-threat event time indicating a time at which the cyber-threat event began, a duration of the cyber-threat event, and/or the like. A global time interval manager 110 can select, at 502, a discrete time interval for a workspace in a workspace graph, e.g., using the cyber-threat event time. For example, the global time interval manager 110 can determine a workspace associated with the cyber-threat event (e.g., based on an identifier associated with the workspace and/or an identifier of an analyst of the workspace in the cyber-threat event data), and can select a discrete time interval of the workspace based on the cyber-threat event time. The global time interval manager 110 can recursively divide, at 504, the discrete time interval into smaller discrete time intervals (e.g., based on dividing the time interval into equal smaller discrete time intervals, dividing the discrete time interval based on whether or not each portion of the discrete time interval is associated with the same cyber-threat score (e.g., time interval TIC score) function, and/or based on other criteria). The global time interval manager 110 can add, at 506, each generated smaller discrete time interval into a time interval queue (e.g., a queue stored in memory and configured to store discrete time intervals to be processed by the global time interval manager 110), and, for each discrete time interval in the queue, can process the received cyber-threat event data using information associated with that discrete time interval.

For example, for each discrete time interval in the time interval queue (e.g., at 508), the global time interval manager 110 can determine, at 510, a cyber-threat score function (e.g., the time interval TIC score function) associated with that discrete time interval, and can calculate, at 512, a cyber-threat score (e.g., a TIC score) for that discrete time interval, using the cyber-threat score function and the cyber-threat event data. The global workspace manager 108 can apply, at 514, the calculated cyber-threat score to the workspace with which the cyber-threat event was associated (e.g., by storing the calculated cyber-threat score as the workspace's cyber-threat score). If there are additional discrete time intervals in the time interval queue (e.g., at 516), the temporal range management server 102 can continue to determine cyber-threat score functions for each discrete time interval, can calculate a cyber-threat score for each remaining discrete time interval (e.g., based on the cyber-threat score function for that discrete time interval and the cyber-threat score calculated for a previously-processed discrete time interval), and can apply the cyber-threat score for each remaining discrete time interval to the workspace. In other words, the actions performed at 510-516 can be repeated for each discrete time interval in the time interval queue.

When the temporal range management server 102 has processed each of the discrete time intervals, the workspace can include a finalized cyber-threat score, based on propagating the changes in a cyber-threat score at one discrete time interval, across all discrete time intervals of the workspace that are affected by the discrete time interval. The global workspace manager 108 can update, at 518, the cyber-threat scores of the remaining workspaces in the workspace graph, based on the final cyber-threat score of the workspace and/or relationships between the workspace and those remaining workspaces. The global workspace manager 108 can provide, at 520, a fully updated workspace graph (e.g., a workspace graph in which each of the workspaces in the workspace graph have been updated) to a local workspace computer 116 (e.g., such as a local workspace computer 116 associated with an analyst that is associated with the workspace, a local workspace computer 116 associated with the cyber-threat event, and/or the like).

Figure 6:
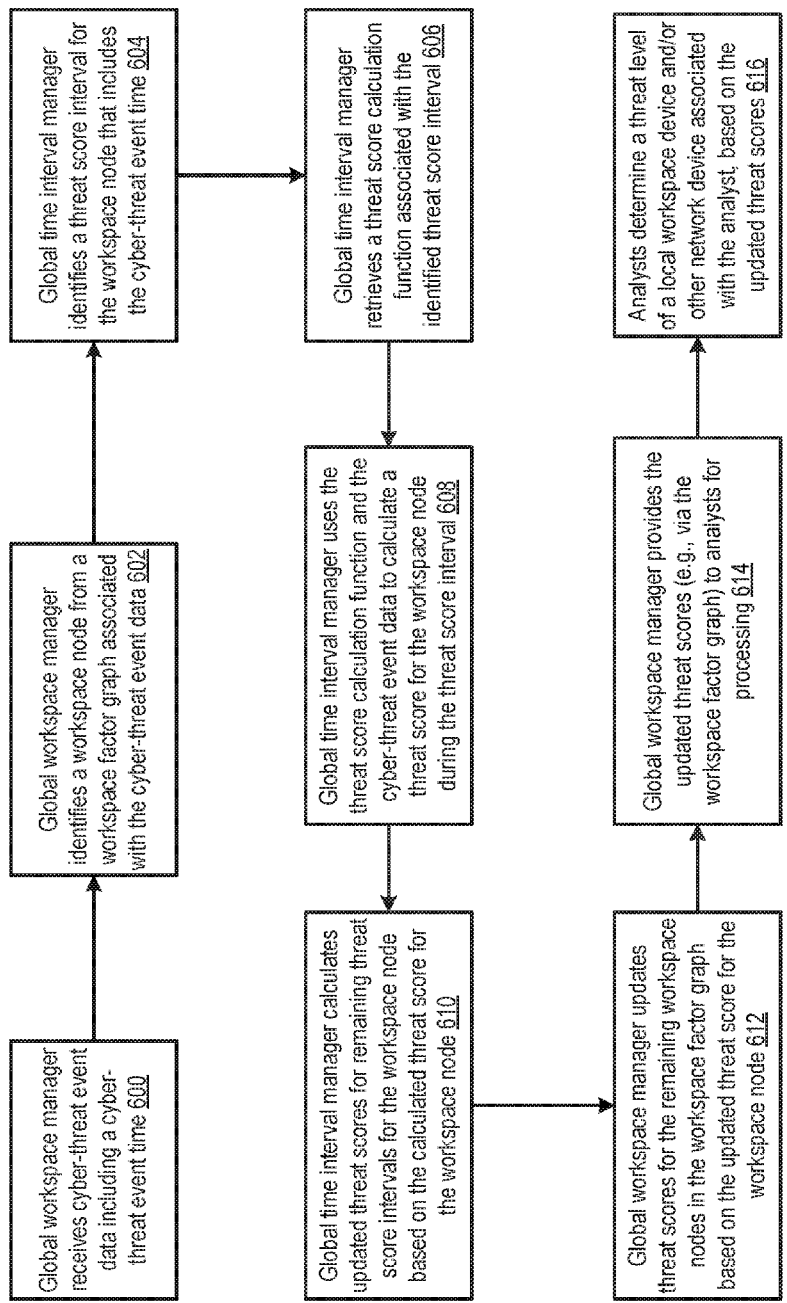
FIG. 6 is a logic flow diagram illustrating calculating threat scores using temporal ranges, according to an embodiment.

FIG. 6 is a logic flow diagram illustrating an example calculation of threat scores using temporal ranges. For example, the global workspace manager 108 can, at 600, receive cyber-threat event data (e.g., from a local workspace computer 116 and/or a different device) that includes a time of a cyber-threat event (e.g., a start time of the cyber-threat event, a duration of the cyber-threat event, and/or the like), and can, at 602, identify a workspace node from a workspace graph that is associated with the cyber-threat event data (e.g., based on an identifier in the cyber-threat event data, and/or other information). The global time interval manager 110 can, at 604, identify a threat score interval (e.g., a discrete time interval, and/or a temporal range) of the workspace node for the cyber-threat event, e.g., based on dividing the timeline of discrete time intervals 402 into threat score intervals and determining a threat score interval that includes the time of the cyber-threat event. The global time interval manager 110 can, at 606, retrieve a threat score calculation function (e.g., a TIC score function, and/or a similar cyber-threat score function) associated with the identified threat score interval, e.g., from the TIC score function table 112*d* of the temporal range database 112. The global time interval manager 110 can, at 608, use the threat score calculation function retrieved from the temporal range database 112, along with the cyber-threat event data, to calculate a threat score for the workspace node at that identified threat score interval. The global time interval manager 110 can, at 610, calculate additional updated threat scores for the workspace node, e.g., by calculating updated threat scores for each remaining threat score intervals for the workspace node, e.g., based on the calculated threat score for the identified threat score interval. The global time interval manager 110 can calculate a final, cumulative threat score for the workspace node based on calculating the threat scores of the various threat score intervals generated from the timeline of discrete time intervals 402 of the workspace node (e.g., by adding and/or otherwise combining the threat scores, by calculating an average of the threat scores, by using the threat scores calculated by threat score intervals as input into remaining threat score calculation functions, and/or by performing a similar action on the threat scores to derive a single threat score for the workspace node).

The global workspace manager 108 can, at 612, update threat scores for the remaining workspace nodes in the workspace graph, e.g., based on the updated threat scores for the workspace node, and/or based on a degree of influence that the workspace node has on the remaining workspace nodes. For example, remaining workspace nodes that are directly connected to the workspace node, and/or that are indirectly related in some manner to the workspace node, can be updated based on the updated threat score of the workspace node. The global workspace manager 108 can, at 614, provide the updated threat scores of the workspaces in the workspace graph to an analyst associated with the network node for processing (e.g., by sending a complete and/or partial version of the workspace graph, including the updated workspaces with updated threat scores, to the local workspace computer 116). The analysts can, at 616, use the workspace graph with the updated workspaces to determine a threat level of the local workspace computer 116, a different local workspace device in the workspace network 100, and/or another network device associated with the analyst, e.g., based on the updated threat score of the workspace node.

Figure 7:
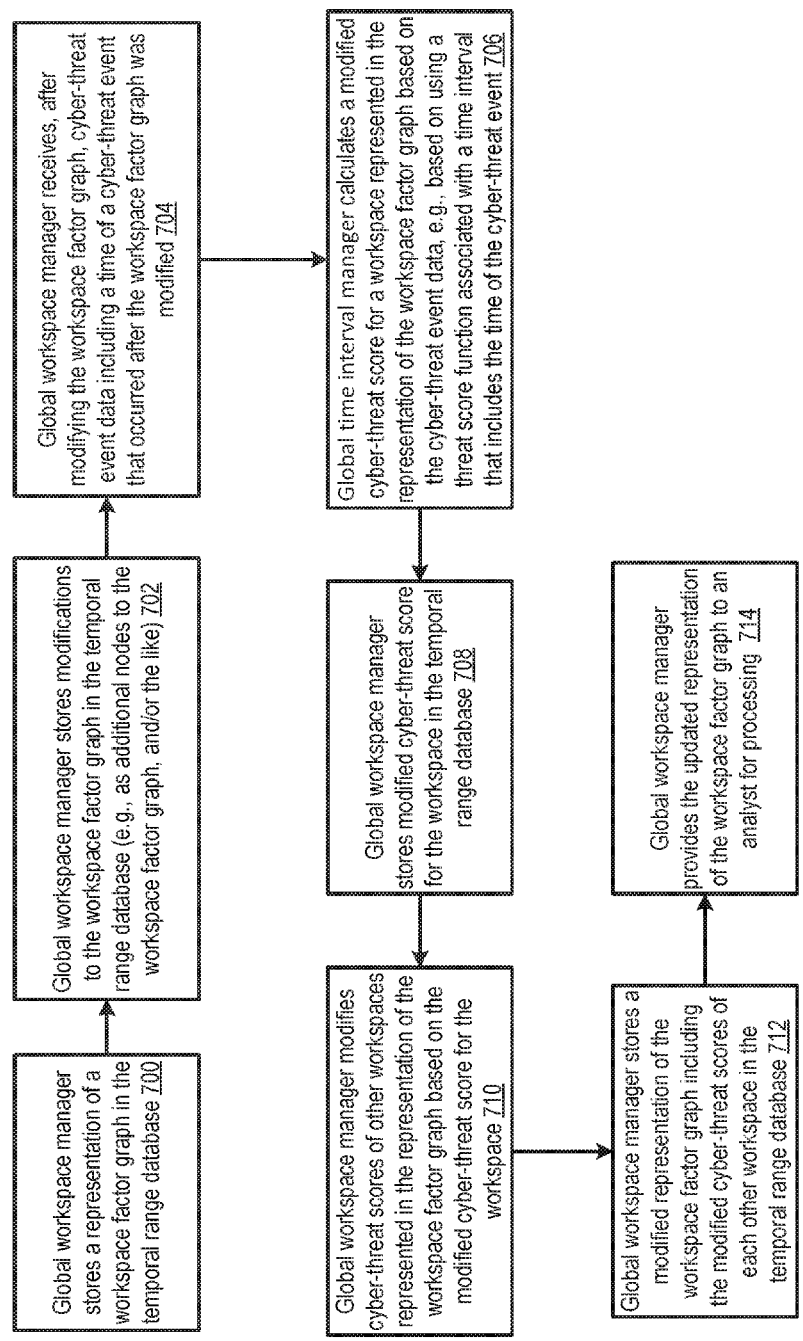
FIG. 7 is logic flow diagram illustrating modifying a representation of a workspace graph using temporal ranges, according to an embodiment.

FIG. 7 is logic flow diagram illustrating modifying a representation of a workspace graph using temporal ranges. For example, in some implementations, a global workspace manager 108 can, at 700, store a representation of a workspace graph in the temporal range database 112. For example, the representation of the workspace graph can be a data structure allowing for a graphical depiction of the workspace graph that includes graphical representations of workspace nodes, connections between the workspace nodes, and/or data associated with the workspace nodes. The global workspace manager 108 can, at 702, store modifications to the workspace graph (e.g., changes to workspace node threat scores, changes to connections between workspace nodes, changes to other workspace node information, and/or the like) in the temporal range database 112, e.g., as additional nodes to the workspace graph, modifications to existing nodes in the workspace graph, and/or in a similar manner. The global workspace manager 108 can also, at 704, receive, after modifying the workspace graph, cyber-threat event data that includes a time of a cyber-threat event for which information was received after the workspace graph was modified. A global time interval manager 110 can, at 706, calculate a modified cyber-threat score for a workspace represented in the representation of the workspace graph, e.g., using the cyber-threat event data, and using a threat score function associated with a time interval that includes the time of the cyber-threat event. The global workspace manager 108 can, at 708, store the modified cyber-threat score for the workspace in the temporal range database 112, e.g., as a cyber-threat score of a data structure that represents the workspace.

The global workspace manager 108 can, at 710, modify cyber-threat scores of other workspaces represented in the representation of the workspace graph, e.g., based on the modified cyber-threat score for the workspace. The global workspace manager 108 can, at 712, store a modified representation of the workspace graph including modified cyber-threat scores of each workspace represented in the representation of the workspace graph, e.g., in the temporal range database 112. The global workspace manager 108 can, at 714, provide the updated representation of the workspace graph to an analyst for processing (e.g., by sending the workspace graph, including the updated workspaces with updated threat scores, to the local workspace computer 116).

Using the apparatus and methods included herein, the temporal range management server 102 can receive cyber-threat event data from a data source at any point before or after a workspace graph has been updated with new data, and can efficiently update the workspace graph. For example, the temporal range management server 102 can process cyber-threat event data received at a first time, can calculate an updated cyber-threat score for the workspace graph, and can later receive cyber-threat event data for a cyber-threat event that occurred before the workspace graph was updated. The temporal range management server 102 can then recalculate an updated cyber-threat score for the workspace graph, incorporating the cyber-threat event data at the relevant time in the timeline of a workspace in the workspace graph, without referring to past iterations of the workspace graph, and/or without the use of stored past copies of the workspace graph, past cyber-threat scores, and/or generally without storing past data in a database. Thus, apparatus and methods described herein allow the temporal range management server 102 to dynamically process asynchronous cyber-threat event data without storing historical cyber-threat scores, historical workspace and/or workspace graph data, and/or similar data to calculate a cyber-threat score. Further, without the use of historical cyber-threat scores and/or workspaces, the temporal range management server 102 can process the asynchronous cyber-threat event data using less data (e.g., merely the cyber-threat event data and a cyber-threat score function, instead of using the cyber-threat event data, historical cyber-threat data, and/or other data), improving the efficiency of the temporal range management server 102.

While systems and methods herein have generally described calculating cyber-threat scores without the use of historical cyber-threat data, however, it should be understood that, in some implementations, a temporal range management server 102 can store, e.g., historical versions of a workspace graph, and/or the like, using a workspace hierarchy factor graph and/or a similar low-data workspace model. In other words, the temporal range management server 102 can use a workspace hierarchy factor graph model to reduce the amount of data stored and/or processed when cyber-threat data is received, even when the temporal range management server 102 stores a historical copy of a workspace graph.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Clojure©, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. An apparatus, comprising:
a global workspace manager implemented in at least one of a memory device or a processor circuit, the global workspace manager, receiving, during operation and from a workspace of a plurality of workspaces, cyber-threat event data including a time of a cyber-threat event associated with a communication network,
a global time interval manager implemented in at least one of a memory device or a processor circuit, the global time interval manager selecting, during operation, a discrete time interval including the time of the cyber-threat event, the global time interval manager, recursively dividing, during operation, the discrete time interval into smaller discrete time intervals, the global time interval manager storing, during operation, the smaller discrete time intervals in a time interval queue,
the global workspace manager determining, during operation and for each discrete time interval in the time interval queue, a threat score function from a plurality of threat score functions and associated with each discrete time interval in the time interval queue,
the global workspace manager calculating, during operation and for each discrete time interval in the time interval queue, a threat score in the time interval queue using the threat score function for that discrete time interval in the time interval queue,
the global workspace manager applying, during operation and for each discrete time interval in the time interval queue, the threat score of the discrete time interval to a workspace factor graph defining a set of relationships between each workspace of the plurality of workspaces so as to initiate an update of a threat score for each remaining workspace of the plurality of workspaces based on a relationship between each of the remaining workspaces of the plurality of workspaces, the global workspace manager generating, during operation, an updated workspace factor graph in which each workspace of the plurality of workspaces is associated with an updated threat score, the generating performed without referring to past iterations of the workspace factor graph, and sending a representation of the updated workspace factor graph to a local workspace computer for analysis of the cyber-threat event.

2. The apparatus of claim 1, further comprising: a local workspace manager implemented in at least one of a memory device or a processor circuit the local workspace manager sending, during operation, a portion of the workspace factor graph including the workspace to a workspace administrator after the threat score for each time interval in the time interval have been applied.

3. The apparatus of claim 1, wherein the global workspace manager stores, during operation, the workspace factor graph after the threat score for each time interval in the time interval have been applied.

4. The apparatus of claim 1, wherein: the workspace is associated with a workspace node in the workspace factor graph; and the global workspace manager applies, during operation the threat score for each discrete time interval in the time interval queue to the workspace factor graph by: calculating a threat score for the workspace node in the workspace factor graph based on the threat score for each discrete time interval in the time interval queue; and calculating a threat score for remaining workspace nodes in the workspace factor graph based on the threat score for the workspace node.

5. The apparatus of claim 1, wherein the discrete time intervals in the time interval queue are ordered in ascending order of discrete time interval size in the time interval queue.

6. The apparatus of claim 1, wherein the discrete time intervals in the time interval queue are ordered based on an earliest time of each discrete time interval.

7. The apparatus of claim 1, wherein the cyber-threat event data is received from a workspace of the plurality of workspaces as a result of a change to a local workspace factor graph including a workspace node associated with the workspace.

* * * * *